United States Patent
McPherson et al.

(10) Patent No.: US 6,410,074 B1
(45) Date of Patent: Jun. 25, 2002

(54) METHOD FOR MAKING A MICROWAVEABLE SPONGE CAKE

(75) Inventors: Andrew E. McPherson, Mt. Prospect; Weizhi Chen, Northfield; Ahmad Akashe, Mundelein; Miranda Miller, Arlington Heights, all of IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/781,907

(22) Filed: Feb. 9, 2001

Related U.S. Application Data

(62) Division of application No. 09/679,483, filed on Oct. 4, 2000.

(51) Int. Cl.[7] .............................................. A21D 10/00
(52) U.S. Cl. ..................... 426/549; 426/94; 426/237; 426/243; 426/496; 426/552; 426/553
(58) Field of Search ........................ 426/94, 549, 496, 426/552, 553, 237, 573, 601, 602, 243

(56) References Cited

U.S. PATENT DOCUMENTS

| | | | |
|---|---|---|---|
| 4,419,377 A | * 12/1983 | Seward et al. | 426/553 |
| 4,684,526 A | * 8/1987 | Knightly | 426/19 |
| 4,847,100 A | * 7/1989 | Kanafani et al. | 426/553 |
| 5,215,774 A | * 6/1993 | Moder et al. | 426/243 |
| 5,534,285 A | * 7/1996 | Setser | 426/496 |

* cited by examiner

*Primary Examiner*—Lien Tran
(74) *Attorney, Agent, or Firm*—Fitch, Even, Tabin & Flannery

(57) ABSTRACT

Microwaveable sponge cakes, which when heated in a microwave oven, rise in a manner similar to conventionally-baked sponge cakes. Such sponge cakes are mesophase gel-containing. Moreover, such mesophase-containing sponge cakes, when microwaved, do not only rise as is observed with conventional sponge cakes, but microwave treatment of these sponge cakes results in highly palatable and light sponge cakes, similar to those that are conventionally prepared. The mesophase gels formed herein for use in sponge cake are highly viscous, even in the absence of polymeric protein or polysaccharide thickening or bulking agents. The mesophase gels is formed using two emulsifiers and an aqueous phase. The addition of the mesophase gel to the other sponge cake components results in a leavening action, and contributes to the palatability and lightness of the resulting sponge cake.

7 Claims, No Drawings

METHOD FOR MAKING A MICROWAVEABLE SPONGE CAKE

This is a division, of prior application Ser. No. 09/679,483, filed Oct. 4, 2000 which is hereby incorporated herein by reference in its entirety.

FIELD OF THE INVENTION

The present invention relates generally to sponge cakes which can be cooked in a microwave oven in a satisfactory manner. More particularly, the present invention relates to a mesophase-containing sponge cake which rises and forms a palatable, light sponge cake when prepared in a microwave oven. The present invention provides snack food-type products which can easily be prepared by the consumer.

BACKGROUND OF THE INVENTION

Sponge cakes are a desirable dessert products. Generally, oven-rising sponge cakes are limited to those for use in a conventional oven and are not as convenient as desired. Microwaved cereal products such as breads and cakes are generally not pleasing to the palate. Microwave heating is generally uneven and, therefore, promotes the rapid onset of staleness and toughness in such cereal products.

Microwaved sponge cakes and products are especially desirable as snack foods (e.g., after school snacks). Such sponge cake batters could be sold directly in, for example, cupcake cups and stored in the freezer until until prepared in a microwave oven. Such products would be attractive to the consumer and convenient to use. Indeed, such sponge cake products could be easily prepared by children.

In order to rise properly, sponge cake must generally contain a substantial amount of trapped air or gas. Such trapped air or gas is introduced in conventional breads and cakes through the use of yeast or chemical leavening agents. The amount of aeration of such bread-like products such as sponge cake is normally described by the term "overrun." Overrun is the relationship of the volume of the aerated food product to that of the unaerated food product and can be calculated with the following formula:
Thus, an overrun of 100 indicates that the volume of the aerated food product is twice as much as the volume of the unaerated food product (i.e., an increase in volume of 100 percent).

The present invention is directed to providing a sponge cake comprising a mesophase-gel and conventional sponge cake components which, when cooked or baked in a microwave oven, rises in a manner similar to conventional oven-baked sponge cake. The present invention does not rely on conventional leavening agents, such as yeast or chemical leavening agents. Rather, a mesophase gel incorporated into the sponge cake batter allows the cake to rise and provides a palatable and light cake when baked in a microwave oven. Moreover, the sponge cake remains palatable for a significant period of time (i.e., about 1 to about 2 hours or longer) after baking.

The present invention provides a sponge cake composition which can be used to provide palatable sponge cake when prepared or heated in a microwave oven. This invention further provides a method for preparation of a microwaveable sponge cake which results in a cake that, upon heating in a microwave oven, (1) rises, (2) is light and palatable, and (3) remains light and palatable for at least 1 hour after heating. These and other advantages of the present invention will be apparent upon a consideration of the present specification.

SUMMARY OF THE INVENTION

The present invention relates to microwaveable sponge cakes, especially microwaveable sponge cakes, which, when heated in a microwave oven, rise in a manner similar to conventionally-baked sponge cakes or other baked goods. The sponge cakes of the present invention contain mesophase gels. Moreover, such mesophase-gel containing sponge cakes, when microwaved, rise in a manner similar to that observed with conventional sponge cakes, and also form highly palatable and firm sponge cakes, similar to conventionally sponge cakes. Such mesophase-gel containing compositions for use in sponge cake include mesophase-containing dispersions for use in fat-free, low-fat, and full-fat sponge cakes.

The mesophase gels formed herein for use in sponge cake are highly viscous, even in the absence of polymeric protein or polysaccharide thickening or bulking agents. The mesophase compositions described herein may be used to prepare desirable sponge cakes which have characteristics such as lightness and airiness when baked in a microwave oven. The mesophase gels have the ability to act as leavening agents in the cakes so that the cake batter rises within about 45 to about 60 seconds for cupcakes, and about 3 to about 10 minutes for regular sponge cake during heating the cake in the microwave oven. The basic mesophase-containing compositions are more fully described in U.S. Pat. No. 6,068,876 (May 30, 2000) entitled "Mesophase-stabilized Emulsions And Dispersions For Use in Low-fat And Fat-free Food Products"; U.S. Pat. No. 6,025,006 (Feb. 15, 2000) entitled "Foam Inducing Compositions and Method for Manufacturing Thereof"; U.S. patent application Ser. No. 09/258,759, filed Feb. 26, 1999, entitled "Use of Mesophase-stabilized Compositions For Delivery of Cholesterol-reducing Sterols And Stanols in Food Products"; and co-pending U.S. patent application entitled "Microwaveable Pizza Crust" filed on the same day as this present application, all of which are owned by the present assignee and all of which are hereby incorporated by reference in their entireties.

The present invention includes mesophase-containing sponge cakes comprising about 5 to about 15 percent of a mesophase gel or foam; about 10 to about 30 percent maltodextrin; about 10 to about 30 percent cake flour; about 1.0 to about 5.0 percent starch; about 5 to about 20 percent sugar; about 0.5 to about 5.0 percent egg white; about 0.5 to about 2.0 percent salt; about 0 to about 1.0 percent vanilla flavoring; and about 25 to about 45 percent water, wherein the sponge cakes rise and are baked to a light and palatable state in a microwave oven.

The present invention also includes methods for making such mesophase-stabilized sponge cakes for use in microwave ovens. One such method comprises (a) forming a dry mixture containing about 10 to about 30 percent maltodextrin, about 10 to about 30 percent cake flour, about 1.0 to about 5.0 percent starch, about 5 to about 20 percent sugar, about 0.5 to about 2.0 percent salt, (b) mixing about 5 to about 15 percent mesophase gel (which has about 20 to about 40 percent maltodextrin and/or sugar and about 20 to 40 percent water added), about 25 to about 45 percent water, and 0 to about 1 percent vanilla flavoring into the dry mixture to form a cake batter, and (c) pouring the cake batter into one or more cake pans; wherein the microwaveable sponge cake batter, when heated using a microwave oven, rises and forms a palatable sponge cake.

DETAILED DESCRIPTION OF THE PREFERRED EMBODIMENT

The present invention relates to microwaveable cakes, especially microwaveable sponge cakes. Such sponge cakes, when heated in a microwave oven, rise in a manner similar to conventionally-baked goods. In addition, such sponge cakes, when subjected to microwave treatment, not only rise, but result in highly palatable and light sponge cakes, which resemble those that are conventionally prepared. Moreover, such sponge cakes maintain their palatable texture for at least 1 hour after baking. The sponge cakes utilize a mesophase structure for leavening and palatable texture of sponge cake baked in microwave ovens. The mesophase-containing sponge cakes described herein are prepared by combining a mesophase gel and conventional ingredients of sponge cake, in the absence of conventional leavening agents such as yeast or chemical leavening agents.

Although not required, conventional microwave susceptors can be used with the present microwaveable cakes if desired. The use of such microwave susceptors can provide a firmer and/or criper product. Generally, however, it is preferred that microwave susceptors not be used with the present invention.

Mesophase gels formed using two or more emulsifiers can be used. Such mesophase gels have been described in U.S. Pat. No. 6,068,876 (May 30, 2000) entitled "Mesophase-Stabilized Emulsions and Dispersions For Use in Low-fat and Fat-free Food Products"; U.S. Pat. No. 6,025,006 (Feb. 15, 2000) entitled "Foam Inducing Compositions and Method for Manufacturing Thereof"; and U.S. patent application Ser. No. 09/258,759, filed Feb. 26, 1999, entitled, "Use of Mesophase-stabilized Compositions For Delivery of Cholesterol-reducing Sterols and Stanols in Food Products." Preferably, an aqueous mesophase composition is formed using two emulsifiers or esters, i.e., a mixture of a first ester or a high HLB emulsifier having an HLB above about 10 and a melting point above about 37° C. and a second ester or a medium hydrophilic/lipophilic balance (HLB) emulsifier selected from the group consisting of diacetyl tartaric esters of a monoglyceride, sorbitan monopalmitates, sorbitan monolaurates, and polyoxythelene stearic acid monoesters, preferably diacetyl tartaric ester of monoglyceride. For purposes of this invention, high HLB emulsifiers have HLB values greater than about 10 and preferably from about 11 to about 25, and medium HLB emulsifiers have HLB values from about 6 to about 10 and preferably from about 6 to about 9. The second ester or high HLB emulsifier can be selected from the group consisting of mono-, di-, and tri-fatty acid esters of sucrose polyglycerol fatty acid esters, polyglycerol fatty acid esters, decaglycerol monostearate, and sodium stearoyl lactylate. An aqueous mixture containing the select emulsifier systems is subjected to heat in a range of about 80 to about 95° C. and high shear at a range of about 5000 to about 50,000 $sec^{-1}$. The process results in a mesophase gel which is useful in the manufacture of microwaveable sponge cake. In important embodiments of the invention, the medium HLB emulsifier is a diacetyl tartaric acid ester of monoglyceride (DATEM), and the high HLB emulsifier is sodium stearoyl lactylate or sucrose stearate.

Mixtures of emulsifiers and water can form a number of different physical structures depending on emulsifier to water ratios, types of emulsifiers (including their HLB values), amounts of emulsifiers, and process variables (e.g., temperature, shear rates, order of component additions, and the like). Such mixtures are generally opalescent dispersions referred to as liquid crystals or mesophases. Mesophase structure may be manifested in several forms such as lamellar, vesicular, cubic, and hexagonal forms, depending upon the emulsifiers used, the emulsifier to water ratios, and the process conditions used.

Preferably, the emulsifiers used to form the mesophase gels of this invention have melting points above about 37° C. Such melting points allow these emulsifiers to be added in powder form to the liquid phases in forming the mesophase. These emulsifiers should also easily crystallize upon cooling to temperatures below their melting point. With such characteristics, the lamellar nature of the mesophase dispersions and mesophase-stabilized emulsions can be stabilized upon cooling. The fatty acid groups can be modified or changed in the various emulsifiers to obtain the desired characteristics.

HLB values for illustrative emulsifiers useful in this invention are as follows: diacetyl tartaric acid monostearate glyceride or DATEM, HLB 8; sucrose monostearate, HLB 16; decaglycerol monostearate, HLB 13; sodium stearoyl lactylate, HLB 21. It should be noted that HLB for charged residues depend on the ionic strength of the aqueous phase. Therefore, although the calculated HLB for sodium stearoyl lactylate is 21, an experimentally derived HLB would be closer to 12. The sucrose esters are mixtures of molecules with various degrees of esterification. Although the monoesters have HLB values of 16 or more, as the length of the ester group is increased, the esters become more lipophilic and the HLB value decreases. Thus, a wide range of HLB values can be obtained from 0 to 18 depending on the number and chain length of the esters. The sucrose esters most preferred for this invention are those with HLB values greater than 10.

Key considerations for the fatty acid ester substituent of the emulsifier components are melting point and crystallization. For example, emulsifiers containing typical cis unsaturated fatty acids often have very low melting points (e.g., below about 30° C.) and are generally not suitable for incorporation in mesophase gels intending to be stored under refrigeration conditions (i.e., not frozen). Such very low melting emulsifiers might disrupt the crystal packing and destroy the lamellar nature of the mesophase complexes which appear to be present in such mesophase gels unless they are handled and stored at very low temperatures. However, for some applications such low melting emulsifiers could, if desired, be used, and, in some cases, may even be preferred. On the other hand, trans unsaturated fatty acids have high melting points and are expected to work well under frozen, refrigerated and room temperature conditions.

The preparation of sucrose fatty acid esters useful in the present invention is described in U.S. Pat. No. 5,565,557. The preparation of polyglycerol fatty acid esters useful in the present invention is described in U.S. Pat. No. 3,637,774. Both of these patents are incorporated by reference.

The fatty acid of the diacetyl tartaric acid mono fatty acid glyceride ester (DATEM) is selected from the group consisting of saturated and unsaturated $C_6$–$C_{22}$ fatty acids. Preferred saturated fatty acids are stearic acid and palmitic acid. Preferred unsaturated fatty acids are long chain ($C_{16}$–$C_{22}$) trans unsaturated fatty acids. The fatty acid of the sucrose fatty acid and polyglycerol fatty acid esters is also selected from the group consisting of saturated and unsaturated $C_6$–$C_{22}$ fatty acids. The preferred saturated fatty acids for the sucrose fatty acid esters and polyglycerol fatty acid esters are stearic acid and palmitic acid. Preferred unsaturated fatty acids are long chain ($C_{16}$–$C_{22}$) trans unsaturated fatty acids. Key considerations in selection of fatty acids are the melting point and crystallization of the fatty acid esters. The preferred fatty acids all result in emulsifiers which have melting points above 37° C. and which easily crystallize upon cooling to temperatures below their melting point. The most preferred fatty acids for all esters are long chain ($C_{16}$–$C_{22}$) saturated fatty acids.

The mixture of emulsifiers to provide the ester vesicles or the mesophase gel contains diacetyl tartaric acid mono fatty acid glyceride ester, or DATEM, at a level of from about 25 to about 75 percent by weight. The second ester is also present at a level of from about 25 to about 75 percent by weight. The preferred mixture contains from about 60 to about 40 percent of each of the first ester and second ester.

Alternatively, mesophase systems prepared using three emulsifiers or esters can be used in the present invention. In such a 3-emulsifier system, the first emulsifier or ester has a high HLB number, in the range from about 11 to about 25. Examples of such emulsifiers include, but are not limited to, sucrose monostearate, sodium stearoyl lactylate, sucrose monolaurate, polyoxyethylene sorbitan monopalmitate, or polyoxyethylene stearic acid monoester. Preferably the first emulsifier is sodium stearoyl lactylate. The second emulsifier or ester of the 3-emulsifier system has an intermediate HLB number ranging from about 6 to about 10. Examples of such emulsifiers include, but are not limited to, a diacetyl tartaric acid ester of monoglyceride (DATEM), sorbitan monopalmitate, sorbitan monolaurate, and polyoxyethylene stearic acid monoester. Preferably, the second emulsifier is DATEM. The third emulsifier or ester of the 3-emulsifier system has a low HLB number, i.e., in the range of about 2 to about 6. Examples of such emulsifiers include, but are not limited to, monoglyceride, glycerol monostearate, sucrose distearate, sorbitan monostearate, glycerol monolaurate, and ethylene glycol monostearate. Preferably, the third emulsifier is monoglyceride.

To prepare the aqueous compositions of the invention, whether based on a 2- or 3-emulsifier system, it is important to provide a well blended homogeneous mixture of the dry powdered emulsifiers, or esters, prior to dispersing the emulsifiers or esters in water. If necessary, when the emulsifier or ester is not a dry powder at ambient temperature, the ester may be frozen and ground to a powder while frozen. Adding the emulsifiers individually to the water phase generally does not form the desired aqueous gel. The mixture of esters are present in the water at a level of from about 2 to about 20 percent. The dispersion is stirred with a suitable mixer (e.g., propeller mixer) while heating to a temperature of from about 80 to about 95° C. over a period of from about 10 to about 30 minutes. The heated dispersion is then cooled to about 55 to about 65° C. within 30 minutes while stirring. The mixture can then be permitted to cool to ambient temperature without stirring. For small batches (i.e., generally less than about 1000 grams), stirring can be discontinued as soon as it reaches the desired elevated temperature. For larger batches, it is generally preferred that stirring is essentially continuous. At the elevated temperature, the composition is a white milky fluid which gels upon cooling. The mixture of emulsifiers forms a complex in the form of multilamellar vesicles upon cooling to refrigeration temperatures. This complex is the mesophase gel. The ester vesicles are dispersed as a matrix in the aqueous medium. The vesicles, which form the mesophase lamellar matrix, generally range in size from about 1 micron to about 20 microns.

The mesophase gel can also be used to prepare very stable foams having a high overrun of from about 200 to about 1200. The foams are especially suitable for forming microwaveable sponge cakes. The foams are stable enough to be frozen and thawed without undergoing syneresis. The foams can be used as is or can be combined with other food products to provide an aerated food product. The microwaveable sponge cake is a suitable food product for incorporation of the mesophase gel or mesophase foams as described herein, because the foaming aspect of the composition gives aeration to the resulting sponge cake.

The foams are prepared by diluting the aqueous gel, if necessary, with additional water to provide a foam base having from about 1 to about 5 percent ester mixture. The foam base is then whipped with a suitable mixer (e.g., a Hobart™ food mixer provided with a wire whip) until the desired level of overrun is obtained. When very low levels of the ester mixture (i.e., from about 1 to about 3 percent) are present in the foam base, it is desirable to provide a bulking agent in the foam base. The bulking agent may be any of the commonly used food bulking agents. The bulking agent, if used, is present in the foam base at levels of from about 20 to about 40 percent. Preferably, however, the bulking agent is sugar.

The above-disclosed mesophase gels or foams may be used to form the desired mesophase-containing sponge cake. Such sponge cake may be formed by forming a dry mixture containing about 10 to about 30 percent maltodextrin, about 10 to about 30 percent cake flour, about 1 to about 5 percent starch, about 5 to about 20 percent sugar about 0.5 to about 2.0 percent salt; mixing about 5 to about 15 percent mesophase gel (which has about 20 to about 40 percent maltodextrin and/or sugar and about 20 to 40 percent water added), about 25 to about 45 percent water and 0 to about 1.0 percent vanilla flavoring into the dry mixture to form a cake batter, and pouring the cake batter into cake pans. The sponge cake batter is then cooked using a microwave oven. For normal cupcake-size sponge cakes, a cooking time of about 45 to about 60 seconds is usually sufficient in a conventional microwave oven. For conventionally-sized sponge cake, a cooking time of about 3 to about 10 minutes is usually sufficient in a conventional microwave oven. The microwaved sponge cake rises in a manner similar to a conventionally baked sponge cake and has texture and mouthfeel similar to conventionally baked sponge cake.

While not wishing to be limited by theory, it is believed that the foaming aspects of the mesophase gel, wherein air is trapped within the gel and or sponge cake batter in the form of air bubbles, provides the ability of the mesophase-containing sponge cake to rise when cooked in a microwave oven. It is believed that the trapped air bubbles of the mesophase are trapped within the sponge cake batter, and upon heating in a microwave oven, cause the batter to rise to a point wherein the batter is palatable after baking. It is also believed that the mesophase-trapped air bubbles or the components of the mesophase themselves cause the sponge cake to achieve palatability and lightness upon baking in a microwave oven. These organoleptic properties are in contrast to conventional cereal products prepared in a microwave oven which generally have a tough and stale texture which is not palatable to the consumer.

In furtherance of the present invention, the mesophase gel and the dry ingredients may be packaged in separate pouches for use in a kit. The contents of the two pouches, along with water, may be combined and mixed, to yield the mesophase-containing sponge cake batter suitable for baking in the microwave as described herein.

The batter (including mesophase gel, dry ingredients, and water) may also be manufactured and sold directly to consumers. Such mesophase sponge cake batter could be poured into a cupcake-type container and frozen. Such a frozen product would allow school-age children to remove the cupcake cups from the freezer, place them in the microwave, bake for 45 to 60 seconds, see their treat rise and take shape, and eat the sponge cupcakes after the treat cools down.

Toppings and/or additives can be used with and/or incorporated into the sponge cakes of the present invention. For example, jam could be placed on top of the batter. Alternatively, chocolate frosting or pudding in the cupcake cup first and then covered with the sponge cake batter. Desserts having multiple layers of fillings and sponge cake could also be prepared. Alternatively, cream cheese, fruit pie filling, or other dessert ingredients could be placed in the cupcake cup along with the sponge cake batter to generate a desirable treat. Alternatively, the sponge cake may be baked and then topped with fresh fruit, whipped cream, or other dessert toppings.

The sponge cake of the present invention may be frozen for long term storage. Such mesophase-containing sponge cake batters are stable at frozen temperatures for at least about 6 months. Frozen mesophase-containing sponge cake batters may be cooked in a microwave oven as described herein. Alternatively, the mesophase-containing sponge cake is stable at refrigerated temperatures for about 1 month. Again, the sponge cake may be baked in a microwave oven as described herein.

Except for the mesophase, conventional ingredients normally used in preparing sponge cake (except, of course, yeast or conventional leavening agents are not needed) can be used. Flavorants may be added via the mesophase; addition of flavorants via the mesophase provides homogeneous dispersion through the final product. The mesophase gel and the batter composition are mixed to form a mesophase-containing batter which may be poured into cake pans and/or cupcake cups to form the sponge cakes. Sponge cakes of conventional and non-conventional shapes can be formed. Such conventional shape styles include, for example, cupcakes, loaf-shaped cakes, layer cakes, tubular pan-shaped cakes, and the like. Flavorings that may be used in manufacture of the sponge cakes described herein are any flavorings that are desirable in sponge cake, especially butter, vanilla, chocolate, lemon, lime, strawberry, other fruit flavorings, nuts and the like.

Other ingredients including, but not limited to, water, maltodextrin, cake flour, sugar, water, starch, egg products, salt, and flavorings can be added or incorporated into the mesophase-containing gel to form a palatable sponge cake. Egg products may be used in any of the embodiments of the present invention and may comprise egg yolk, salted egg yolk, whole eggs, liquid egg product, spray-dried egg yolk, spray-dried whole egg, or any other form of egg product.

The flour that may be used may be any edible flour, such as cake flour, bleached or unbleached hard to soft white flour, whole wheat flour, soy flour, rice flour, corn flour, and the like. Other edible flours may also be used. A single edible flour or mixtures of such edible flours may be used.

The following example is intended to illustrate the invention and not to limit it. Unless otherwise indicated, all percentages are by weight. All patents, patent applications, and literature references cited herein are hereby incorporated by reference.

EXAMPLE

A mesophase-containing sponge cake was prepared using the following components:

| Mesophase Gel Components | |
|---|---|
| diacetyl tartaric acid ester of monoglyceride | 15.0 g |
| sodium stearoyl lactylate | 15.0 g |
| water | 470.0 g |

| Sponge Cake Components | |
|---|---|
| Salt | 4.0 g |
| Egg white | 10.0 g |
| Cake flour | 60.0 g |
| Maltodextrin DE 4-5 | 65.0 g |
| Sugar | 50.0 g |
| Waxy Corn Starch (dual modified) | 13.0 g |
| Water | 125.0 g |
| Flavor Vanilla | 0.5 g |
| Meso Foam (10 g mesophase gel, 10 g malodextrin/sugar, 10 g water) | 30 g |

The "meso foam" was prepared by blending mesophase gel (formed from the mesophase components), additional malodextrin/sugar, and additional water in a 1.1:1 ratio.

The mesophase gel or foam may be used to manufacture a desirable sponge cake cupcake. The mesophase gel was formed by mixing 15.0 g sodium steroyl lactylate, 15.0 g diacetyl tartaric acid ester of monoglyceride, and 470 g water and subjecting the mixture to 10,000 sec$^{-1}$ shear at about 95° C. for about 15 minutes. The mixture was then cooled to room temperature with agitation. The resulting mesophase gel is viscous. The mesophase gel (9.0 g) is combined with 9.0 g maltodextrin and 9.0 g water with gentle mixing to form a mesophase-maltodextrin mixture. The mesophase-maltodextrin mixture (30.0 g) is combined with 30.0 g sugar and 30.0 g water with gentle mixing to form a mesophase-sugar mixture.

The dry ingredients, salt, cake flour, maltodextrin, sugar, and starch are blended. The water, flavoring and dry ingredients are added to the mesophase-sugar mixture and mixed until homogeneous. The resulting batter is poured into cupcake cups and frozen until baked in a microwave oven. The organoleptic properties are similar to those of a traditionally prepared sponge cake.

We claim:

1. A method for making a microwaveable cake which can be heated in a microwave oven, said method comprising:
   (a) forming a dry mixture containing about 10 to about 30 percent maltodextrin; about 10 to about 30 percent cake flour; about 1.0 to about 5.0 percent starch; about 5 to about 20 percent sugar; about 0.5 to about 2.0 percent salt;
   (b) forming a mesophase-maltodextrin mixture by adding about 1 to about 3 percent maltodextrin to a mesophase get;
   (c) forming a mesophase-sugar mixture by mixing about 5 to about 15 percent mesophase-maltodextrin mixture; about 5 to about 20 percent sugar; about 25 to about 45 percent water; and about 0 to about 1.0 percent vanilla flavoring together;
   (d) adding the mesophase-sugar mixture to the dry mixture to form a sponge cake batter; and
   (e) pouring the sponge cake batter into cake pans; wherein the microwaveable cake batter, when heated using a microwave oven, rises and forms a palatable cake;

wherein the mesophase gel comprises either
   (1) a high HLB emulsifier which has an HLB of between about 11 and about 25 and a medium HLB emulsifier which has an HLB of between about 6 and 10; or
   (2) a high HLB emulsifier which has an HLB of between about 11 and about 25, a medium HLB emulsifier which has an HLB of between about 6 and about 10, and a low HLB emulsifier which has an HLB of between about 2 and about 6.

2. The method of claim 1, wherein the cake is a sponge cake and wherein the mesophase gel comprises the high HLB emulsifier and the medium HLB emulsifier.

3. The method of claim 2, wherein the high HLB emulsifier is selected from the group consisting of mono-, di-, and tri- fatty acid esters of sucrose polyglycerol fatty acid esters, polyglycerol fatty acid esters, decaglycerol monostearate, and sodium stearoyl lactylate; and wherein the medium HLB emulsifier is selected from the group consisting of diacetyl tartaric acid esters of a monoglyceride, sorbitan mono palmitates, sorbitan monolaurates, and polyoxyethylene stearic acid monoesters.

4. The method of claim 3, wherein the high HLB emulsifier is sodium steroyl lactylate and the medium HLB emulsifier is diacetyl tartartic acid ester of monoglyceride.

5. The method of claim 1, wherein the mesophase gel comprises about 10 to 60 percent of the high HLB emulsifier, about 1 to about 40 percent of the medium HLB emulsifier, and about 20 to about 60 percent of the low HLB emulsifier.

6. The method of claim 5, wherein the high HLB emulsifier is sodium stearoyl lactylate, the medium HLB emulsifier is diacetyl tartaric acid ester of a monoglyceride, and the low HLB emulsifier is monoglyceride.

7. The method of claim 1, wherein the cake comprises about 6 to about 12 percent of a mesophase gel; about 15 to about 22 percent maltodextrin; about 12 to about 18 percent cake flour; about 2 to about 4.5 percent starch; about 10 to about 17 percent sugar; about 1.5 to about 4 percent egg product; about 1 to about 2 percent salt; 0 to about 0.75 percent flavoring; and about 30 to 40 percent water.

* * * * *

UNITED STATES PATENT AND TRADEMARK OFFICE
CERTIFICATE OF CORRECTION

PATENT NO.     : 6,410,074 B1                                      Page 1 of 1
DATED          : June 25, 2002
INVENTOR(S)    : McPherson et al.

It is certified that error appears in the above-identified patent and that said Letters Patent is hereby corrected as shown below:

Column 8,
Line 57, change "get" to -- gel --.

Signed and Sealed this

Eleventh Day of February, 2003

JAMES E. ROGAN
*Director of the United States Patent and Trademark Office*